US 6,657,160 B2

(12) United States Patent
Hackel et al.

(10) Patent No.: US 6,657,160 B2
(45) Date of Patent: Dec. 2, 2003

(54) LASER PEENING OF COMPONENTS OF THIN CROSS-SECTION

(75) Inventors: Lloyd A. Hackel, Livermore, CA (US); John M. Halpin, Tracy, CA (US); Fritz B. Harris, Jr., Rocklin, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/771,179

(22) Filed: Jan. 25, 2001

(65) Prior Publication Data

US 2002/0096503 A1 Jul. 25, 2002

(51) Int. Cl.[7] .......................... B23K 26/00; B23K 26/14
(52) U.S. Cl. ................................. 219/121.85
(58) Field of Search ................. 148/525, 565; 219/121.6, 121.85

(56) References Cited

U.S. PATENT DOCUMENTS

| 3,850,698 | A | | 11/1974 | Mallozzi et al. ............... 148/4 |
|---|---|---|---|---|
| 4,401,477 | A | | 8/1983 | Clauer et al. .................. 148/4 |
| 4,937,421 | A | | 6/1990 | Ortiz, Jr. et al. ........ 219/121.68 |
| 5,394,875 | A | * | 3/1995 | Lewis et al. |
| 5,492,447 | A | | 2/1996 | Mannava et al. ........... 415/200 |
| 5,522,706 | A | | 6/1996 | Mannava et al. ........... 416/215 |
| 5,525,429 | A | | 6/1996 | Mannava et al. ........... 428/610 |
| 5,531,570 | A | | 7/1996 | Mannava et al. ....... 416/241 R |
| 5,569,018 | A | | 10/1996 | Mannava et al. ........... 415/200 |
| 5,584,586 | A | | 12/1996 | Casarcia et al. ............ 384/625 |
| 5,584,662 | A | | 12/1996 | Mannava et al. ....... 416/241 R |
| 5,591,009 | A | | 1/1997 | Mannava et al. ....... 416/241 R |
| 5,620,307 | A | | 4/1997 | Mannava et al. ....... 416/241 R |
| 5,671,628 | A | | 9/1997 | Halila et al. .................... 72/53 |
| 5,674,328 | A | | 10/1997 | Mannava et al. ........... 148/525 |
| 5,674,329 | A | | 10/1997 | Mannava et al. ........... 148/525 |
| 5,675,892 | A | | 10/1997 | Mannava et al. ............. 29/889 |
| 5,689,363 | A | * | 11/1997 | Dane et al. |
| 5,730,811 | A | | 3/1998 | Azad et al. .................. 148/565 |
| 5,735,044 | A | | 4/1998 | Ferrigno et al. .............. 29/889 |
| 5,741,559 | A | | 4/1998 | Dulaney ....................... 427/554 |
| 5,742,028 | A | | 4/1998 | Mannava et al. ....... 219/121.82 |
| 5,744,781 | A | | 4/1998 | Yeaton ................... 219/121.84 |
| 5,756,965 | A | | 5/1998 | Mannava ................ 219/121.85 |
| 5,846,054 | A | | 12/1998 | Mannava et al. ........ 416/219 R |
| 5,846,057 | A | | 12/1998 | Ferrigno et al. ......... 416/241 R |
| 5,911,890 | A | | 6/1999 | Dulaney et al. ........ 219/121.85 |
| 5,911,891 | A | | 6/1999 | Dulaney et al. ........ 219/121.85 |
| 5,932,120 | A | | 8/1999 | Mannava et al. ....... 219/121.85 |
| 5,935,464 | A | | 8/1999 | Dulaney et al. ........ 219/121.65 |
| 5,948,293 | A | | 9/1999 | Somers et al. ......... 219/121.85 |
| 5,951,790 | A | | 9/1999 | Mannava et al. ............ 148/510 |
| 5,980,101 | A | | 11/1999 | Unternahrer et al. .......... 374/32 |
| 5,987,042 | A | | 11/1999 | Staver et al. ................... 372/30 |
| 5,987,991 | A | | 11/1999 | Trantow et al. ................ 73/624 |
| 5,988,982 | A | | 11/1999 | Clauer ..................... 416/241 R |
| 6,002,102 | A | | 12/1999 | Dulaney et al. ........ 219/121.85 |
| 6,002,706 | A | | 12/1999 | Staver et al. ................. 372/108 |
| 6,005,219 | A | | 12/1999 | Rockstroh et al. ..... 219/121.85 |
| 6,021,154 | A | | 2/2000 | Unternahrer ................. 372/108 |
| 6,049,058 | A | | 4/2000 | Dulaney et al. ........ 219/121.84 |
| 6,057,003 | A | | 5/2000 | Dulaney et al. ............. 427/457 |
| 6,064,035 | A | | 5/2000 | Toller et al. ........... 219/121.86 |
| 6,075,593 | A | | 6/2000 | Trantow et al. ............. 356/318 |
| 6,078,022 | A | | 6/2000 | Dulaney et al. ........ 219/121.85 |
| 6,127,649 | A | | 10/2000 | Toller et al. ........... 219/121.86 |
| 6,130,400 | A | | 10/2000 | Rockstroh ................ 219/121.6 |
| 6,144,012 | A | * | 11/2000 | Dulaney et al. ........ 219/121.85 |
| 6,155,789 | A | | 12/2000 | Mannava et al. ....... 416/241 R |
| 6,320,989 | B1 | * | 11/2001 | Montgomery et al. |
| 6,333,488 | B1 | * | 12/2001 | Lawrence et al. ...... 219/121.85 |

FOREIGN PATENT DOCUMENTS

EP   0 085 278   8/1983

* cited by examiner

*Primary Examiner*—Geoffrey S. Evans
(74) *Attorney, Agent, or Firm*—Eddie E. Scott; Alan H. Thompson (57) ABSTRACT

The properties of a metal piece are altered by laser peening the piece on the first side using an acoustic coupling material operatively connected to the second side and subsequently laser peening the piece on the second side using an acoustic coupling material operatively connected to the first side

16 Claims, 6 Drawing Sheets

LASER PEENING OF COMPONENTS OF THIN CROSS-SECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to industrial applications of lasers and more particularly to laser peening of metals.

2. State of Technology

Improving the strength of metals by cold working undoubtedly was discovered early in civilization, as ancient man hammered out his weapons and tools. Since the 1950s shot peening has been used as a means to improve the fatigue properties of metals. Another method of shock processing involves the use of high explosive materials in contact with the metal surface. The use of high intensity laser outputs for the generation of mechanical shock waves to treat the surfaces of metals has been well known since the 1970s. The laser shock process can be used to generate compressive stresses in the metal surfaces adding strength and resistance to corrosive failure. Lasers with pulse outputs of 10 to 100 J and pulse durations of 10 to 100 ns are useful for generating inertially confined plasmas on the surfaces of metals. These plasmas create pressures in the range of 10,000 to 100,000 atmospheres and the resulting shock pressure can exceed the elastic limit of the metal and thus compressively stress a surface layer as deep or deeper than 1 mm in the metals.

The article, "Blasts of Light to Strengthen Metals," *Science & Technology Review,* October 1998, provides the following description: "At first glance, it would seem that bombarding a metal part with an intense stream of tiny metal or ceramic balls might not be the best approach for making that part more resistant to cracking and corrosion. And yet, shot peening is a tried-and-true technique for strengthening metals. Now a team of Lawrence Livermore researchers, in tandem with colleagues at New Jersey-based Metal Improvement Co. Inc., have replaced the tiny balls with short-lived, repetitive blasts of light from a reliable, high-powered laser."

U.S. Pat. No. 4,401,477 for laser shock processing, by Clauer et al, patented Aug. 30, 1983, provides the following description ". . . constitutes an improvement of the U.S. Pat. No. 3,850,698 which is the basic method of laser shock processing a solid target with a radiation pulse of high power generation, the disclosure of which is herein incorporated by reference. The patented invention is particularly useful when the target material is sufficiently thick so that the stress wave does not penetrate to the back surface of the target material." Their more recent invention involved "the mounting of a trapping material (hereinafter referred to as a momentum trap) that is placed along the back surface of the metal substrate to be laser shock processed. It is important that the trap and the substrate have substantially the same acoustical impedance. Other material properties that are important are a matching of material densities, and sound speed. Preferably, the trap and the substrate are the same material, so that no matching is needed. The trap is placed against the back surface of the substrate, and mineral oil can be used there between to enhance the coupling of the materials. A spring-loaded, disk-shaped trapping material is placed against the substrate. An overlay material that is substantially transparent to laser radiation (e.g.--fused quartz, acrylic, water) is placed in direct contact with the front surface of the specimen. Initially the specimen is coated with a thin layer of paint, preferably black, to enhance absorption of the laser radiation and to protect the surface from melting by the radiation. A high power, pulsed laser emits a high intensity pulse of short duration radiation that passes through the overlay material, is absorbed by the paint, produces a high pressure condition at the front surface of the metal substrate, thereby driving a high amplitude stress wave into and through the metal substrate and into the momentum trap. The surface of the paint is vaporized when it is struck by the laser radiation causing an extremely high pressure near the surface when the vaporized gas is trapped between the specimen surface and the transparent overlay. At the back surface of the target specimen the stress wave passes into the momentum trap and is reflected back from the back surfaces. However, the momentum imparted to the trap by the reflected wave causes the spring loaded trap to break away and disconnect from the specimen after the stress wave is reflected from the back surface of the momentum trap and strike the common surface of the specimen and the trap. The momentum trap thereby carries away the tensile wave which would produce distortion in the specimen. Another means of absorbing the stress wave after it has passed through the metal substrate involves the use of a large mass of material, having a long dimension in the same direction as the stress wave, and having substantially the same acoustical impedance as the metal substrate. Being in direct contact with the metal substrate, and mounted so that the stress wave passes through the long dimension of the material mass, the stress wave is considerably weakened when it is reflected back to the common surface of the mass and the substrate." European Patent No. 085278A1 for split beam method of altering material properties, by Clauer et al, issued Aug. 10, 1983, discloses the use of a split beam to simultaneously laser shock the opposing two sides of the target material. "However, the split beam method has several inherent disadvantages. 1. To shock process two sides simultaneously requires that the laser generate twice the power as for only doing one side. High powered lasers are extremely expensive and such cost may be prohibitive. 2. The split beam method requires the use of precisely calibrated and positioned lenses and mirrors. This precision may be difficult to achieve in a high production manufacturing environment. 3. In many applications only one side of the metal substrate is subject to fatigue, so there is no need to use the split beam method. In other applications, it is not possible to have line of sight access to both sides of the fatigue critical region for split beam processing." This description of the process for simultaneous dual sided peening thin sections fails to adequately recognize or address the problem of internal spalling.

U.S. Pat. No. 5,531,570 for distortion control for laser shock peened gas turbine engine compressor blade edges, by Mannava et al, patented Jul. 2, 1996, provides the following description, "A method for counteracting distortion of the airfoil caused by laser shock peening a gas turbine engine compressor metallic airfoil along its leading and/or trailing edge to form laser shock peened surfaces extending radially along at least a portion of the edges with a region having deep compressive residual stresses imparted by laser shock peening (LSP) extending into the airfoil from the laser shock peened surfaces." Although this patent discusses distortion of the part shape, it also fails to address an effective approach to peening of thin components without internally spalling.

SUMMARY OF THE INVENTION

The present invention provides a system for altering the properties of a metal piece having first and second surfaces by a process of laser peening. In an embodiment of the invention, the properties of a metal piece having first side and a second side are altered by laser peening the piece on the first side using an acoustic coupling material operatively connected to the second side. In another embodiment of the invention, laser peening is employed from one side at a time with a material on the back side that couples a portion or all of the shock wave out of the metal. Other features and advantages of the present invention will become apparent from the following detailed description. It should be understood, however, that the detailed description and the examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate embodiments of the invention and, together with the general description of the invention, and the detailed description of the embodiments, serve to explain the principles of the invention.

DETAILED DESCRIPTION OF THE INVENTION

Referring now to the drawings, specific embodiments of the invention are illustrated. The detailed description of the specific embodiments, together with the general description of the invention, serve to explain the principles of the invention.

Improving the strength of metals by cold working undoubtedly was discovered early in civilization, as ancient man hammered out his weapons and tools. Since the 1950s shot peening has been used as a means to improve the fatigue properties of metals. At first glance, it would seem that bombarding a metal part with an intense stream of tiny metal or ceramic balls might not be the best approach for making that part more resistant to cracking and corrosion. And yet, shot peening is a tried-and-true technique for strengthening metals. The use of high intensity laser outputs for the generation of mechanical shock waves to treat the surfaces of metals has been well known since the 1970s. The laser shock process can be used to generate compressive stresses in the metal surfaces adding fatigue strength and resistance to corrosive failure.

The currently accepted practice for laser peening thin section materials, such as jet engine fan and compressor blades, is to apply a simultaneous laser pulse to each side of the piece being peened. This approach results from the belief that the simultaneous counter propagating shock waves will counteract the distortion associated with peening only one side at a time. However one can recognize that the simultaneous waves actually create a deleterious doubly intense tensile wave within the part. This intense tensile wave can undo the peening effect and actually rupture (spall) the interior material. The present invention employs laser peening from one side at a time and places a material on the back side that couples the shock wave out of the metal preventing its reflection and deleterious effect.

Figure 1:
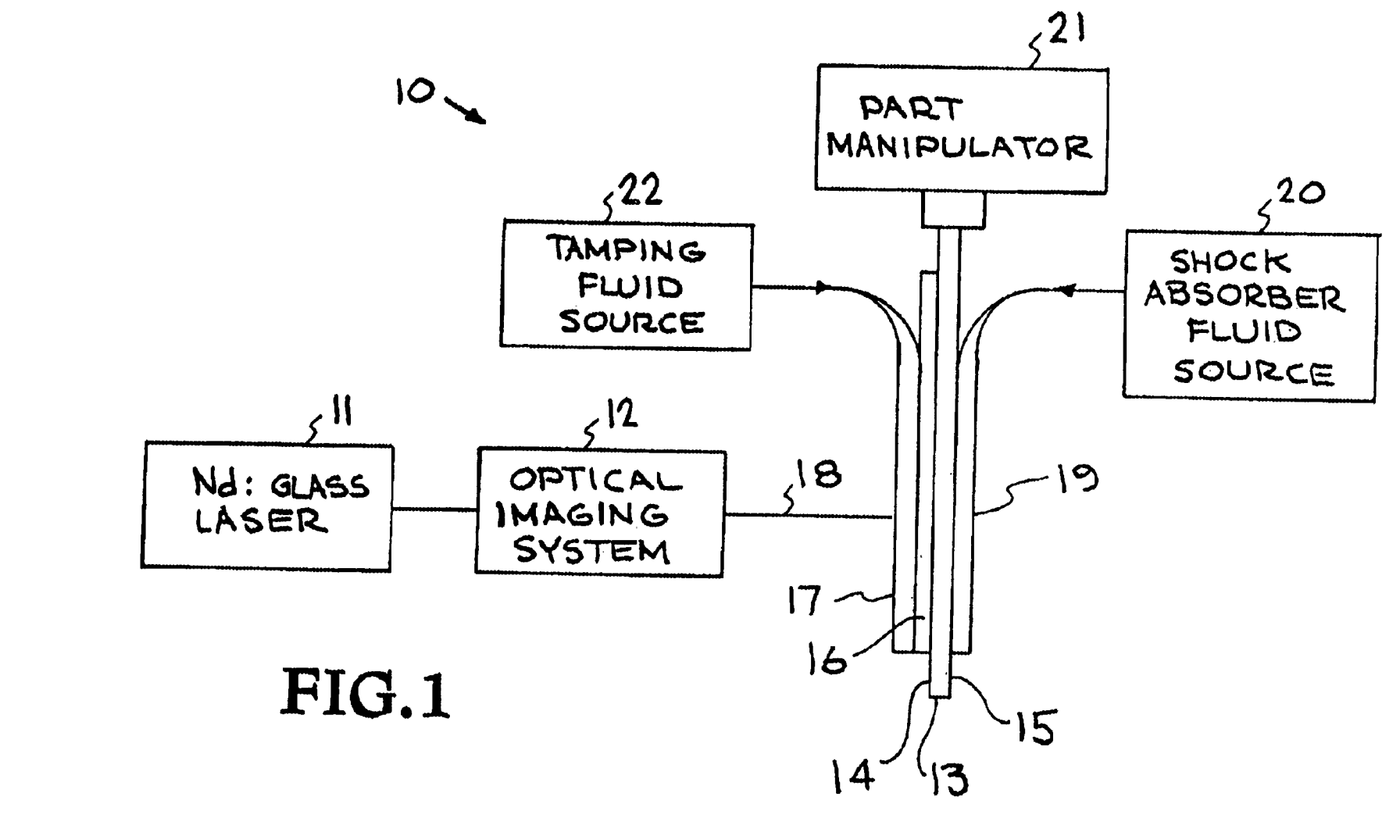
FIG. 1 shows a system for laser peening a part.

Referring now to FIG. 1, a system for laser peening a part is shown and designated generally by the reference numeral 10. The near field output of a beam from a laser such as a Nd:glass laser is image relayed to the part to be peened. The front surface of the part is coated with an ablative layer and a pressure confinement (tamping) layer of fluid is flowed over the ablative layer. This layer, transparent to the laser light, confines the plasma pressure that develops and greatly increases the intensity of the shock wave that transmits into the metal. In the recommended configuration, the laser beam output comprises a rectangular beam that allows precise and uniform overlap of pulses and hence highly uniform compressive stress from front to back side within the part. This minimizes distortion of the peened part.

It has become accepted practice in the laser peening of metal components with thin cross sections to simultaneously peen both sides with the intent of preventing component distortion. This technique is described in a European patent European Patent Application 82810554.4 filed Dec. 20, 1982 entitled "Split Beam Method of Altering Material Properties" by Clauer et al and U.S. Pat. No. 5,531,570 entitled "Distortion Control for Laser Shock Peened Gas Turbine Engine Compressor Blade Edges" by S. R. Mannava et al of General Electric Company.

It was believed that by bringing a split laser pulse to each side of the metal, nearly equal opposing forces and hence traveling shock waves could be generated to prevent "backside" spallation or distortion of the metal. In the analysis that led to the present specific embodiments, it was learned that the propagation duration of the shock wave through the metal is substantially long, on the order of 200 ns, such that the typically 20 ns long duration laser pulse and its corresponding back pressure have long since ended before the shock wave reaches the output surface. Thus the intended effect of balancing the forces will not be realized. In fact, an adverse effect actually occurs in that as a shock wave reaches the metal to air (or plastic) interface at the far side of the part, it strongly reflects due to the impedance difference at the boundary and additionally the reflected shock wave is inverted becoming a tensile wave. The tensile waves resulting from each of the two reflected waves interfere near the center of the metal part causing a doubly intense cavitation force that can spall or split apart the metal in the center.

In the analysis that led to the present specific embodiments, it was discovered that improvement could be made by laser peening only one side of the thin section material at a time. A uniformly controlled, rectangular shaped laser pulse is incident from one (front) side only and creates a shock wave. On the back side a liquid such as water or a florochemical liquid or FLUORINERT®or a nonflammable fluorocarbon compound or FREON® is flowed over the surface directly behind the area to be peened with a thickness of about 1 mm. FLUORINERT® is a florochemical liquid sold under the FLUORINERT® U.S. Trademark and manufactured and sold by 3M Corporation, Minneapolis, Minn. FREON® is a nonflammable fluorocarbon sold under the FREON® U.S. Trademark by DuPont, Wilmington, Del. Alternately a sound absorbing material can be pressed against the surface. Using the density of water as 1000 kg/m3 and the sound velocity as 1461 m/s, as the shock wave propagates to the back side a reflected wave is generated of intensity relative R=–0.84 for water.

As indicated by the negative sign, this wave propagates back as a tensile wave but because the thin material is being peened on only a single side, it now has no counter propagating wave with which to interfere. Thus the magnitude of the tensile force is reduced by a factor of 2.4 over that of dual sided peening, a factor that can be critical in preventing cavitation or spalling in the material.

Referring again to FIG. 1, The system 10 for laser peening a part is shown. The near field output of a beam from a laser ills image relayed by the optical imaging system 12 to the part 13 to be peened. The front surface 14 of the part 13 is coated with an ablative layer 16 and a pressure confinement (tamping) layer 17 of fluid is flowed over the ablative layer 16. The pressure confinement (tamping) layer 17 of fluid is provided by the tamping fluid source 22. This layer 17, transparent to the laser light 18, confines the plasma pressure that develops and greatly increases the intensity of the shock wave that transmits into the metal part 13. The part 13 is peened with an acoustic coupling material, shock absorbing layer 19. The acoustic coupling material, shock absorbing layer 19 can be a material such as water a florochemical electronic liquid, FLUORINERT, or a nonflammable fluorocarbon compound, FREON, applied over the back side 15 of the part 13. The acoustic coupling material/shock absorbing layer 19 material is provided by the shock absorber fluid source 20. The laser beam output comprises a rectangular beam that allows precise and uniform overlap of pulses and hence highly uniform compressive stress from front to back side within the part. This minimizes distortion of the peened part. The part 13 is positioned within the system 10 by the part manipulator 21.

Figure 2A:
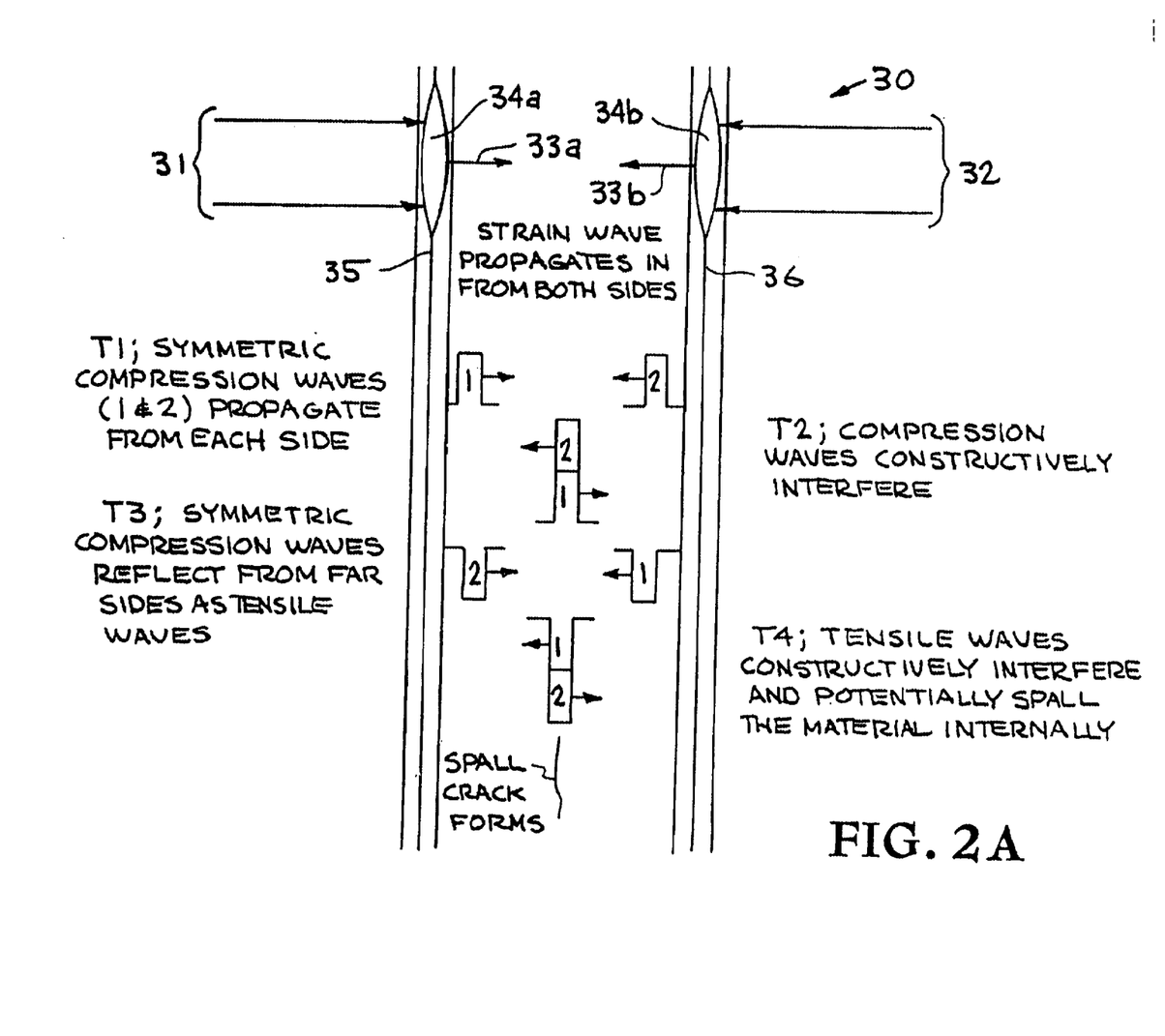
FIGS. 2A and 2B illustrate the behavior of the shock waves for dual sided and single sided peening.
Figure 2B:
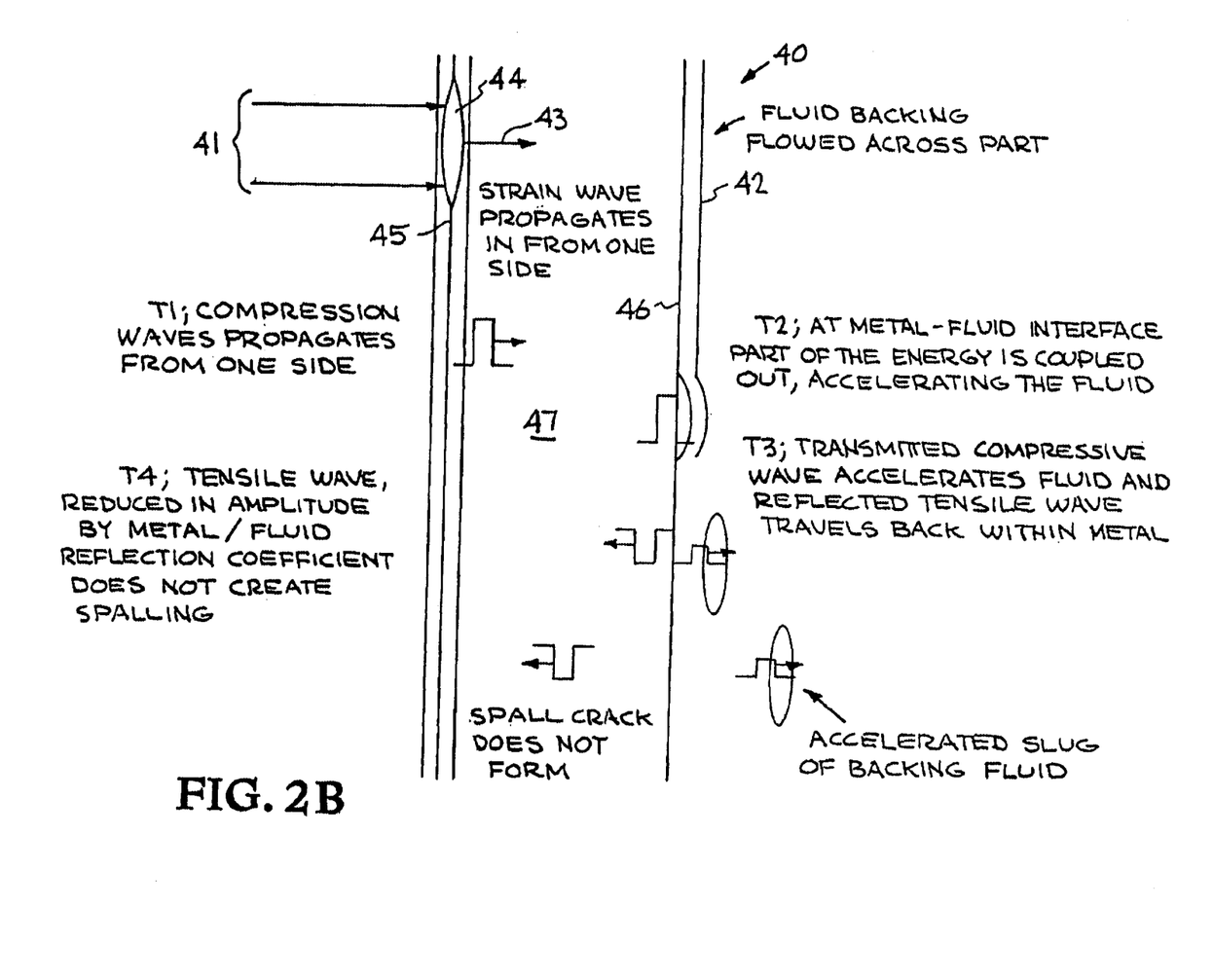

The behavior of the shock waves for dual sided and single sided peening is illustrated graphically in FIGS. 2A and 2B. The behavior of the shock waves for dual sided peening, designated generally by the reference numeral 30, is illustrated in FIG. 2A. The behavior of the shock waves for single sided peening, designated generally by the reference numeral 40, is illustrated in FIG. 2B.

As shown in FIG. 2A, laser beams 31 and 32 are simultaneously directed onto sides 35 and 36 respectively. The compressive pressure pulse T1, for example [1], from one side 35 has traversed to the opposite side 36 by the time the first pressure pulse T1[2] reaches its far side 36. Both pulses reflect from their respective back sides and form reverse traveling tensile waves. These waves constructively interfere near the middle of the material and form the doubly intense tensile force that can spall (tear apart) the metal in the center. There is also no apparent benefit to having a pressure pulse simultaneous on both sides.

As shown in FIG. 2b, a laser beam 41 is directed onto one side 45 of a part 47. The strain wave 43 propagates in from side 45. The compressive pressure pulse T1 from side 45 propagates from side 45. The analysis that led to the present specific embodiments focused on eliminating the dual counter propagating waves shown in FIG. 2A. In the present specific embodiments shown in FIG. 2B, the part 47 is peened on one side at a time with the acoustic coupling material 42, such as water or fluorinert, applied over the back side 46. The closer the acoustic impedance, given by the product of material density and speed of sound in the material, of the backing is to that of the material being peened, the greater fraction of the shock wave is coupled out. After peening a single layer of one side of a component, the component is rotated 180 degrees and the opposite side is peened again with a coupling material applied to the back side to couple out the acoustic shock wave. With careful placement of the peening to each side thereby producing equal counterbalancing compressive residual stress fields, distortion induced from peening the first side is fully removed.

Figure 3A:
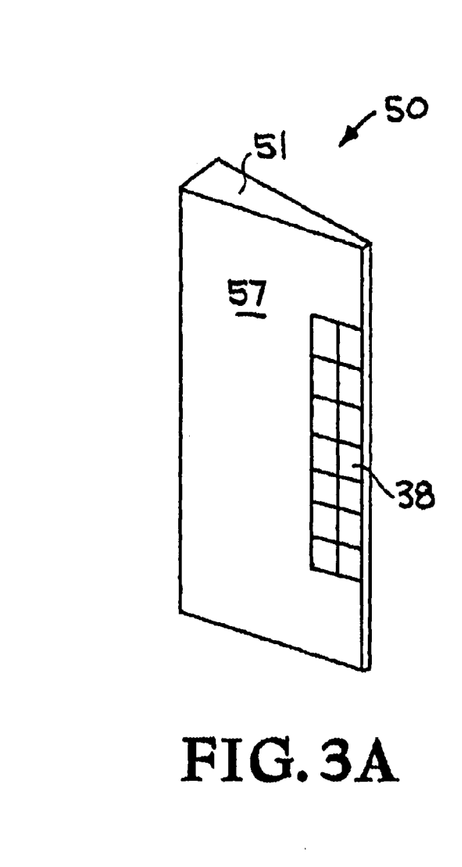
FIG. 3 shows a counterbalancing effect.
Figure 3B:
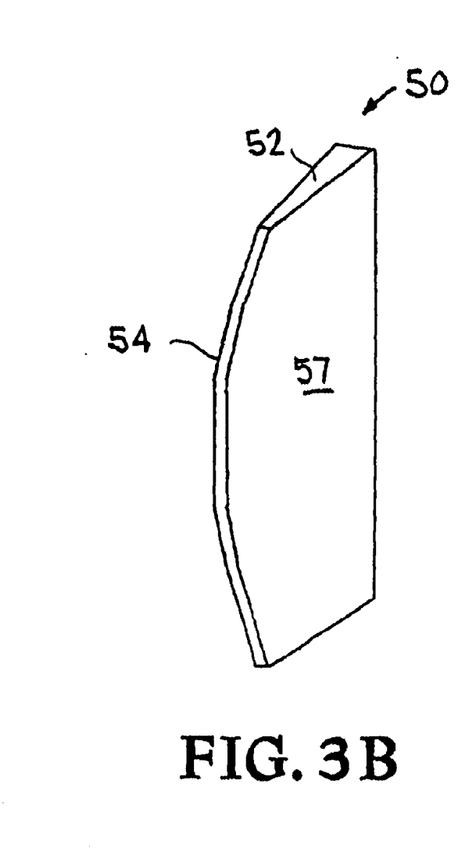
Figure 3C:
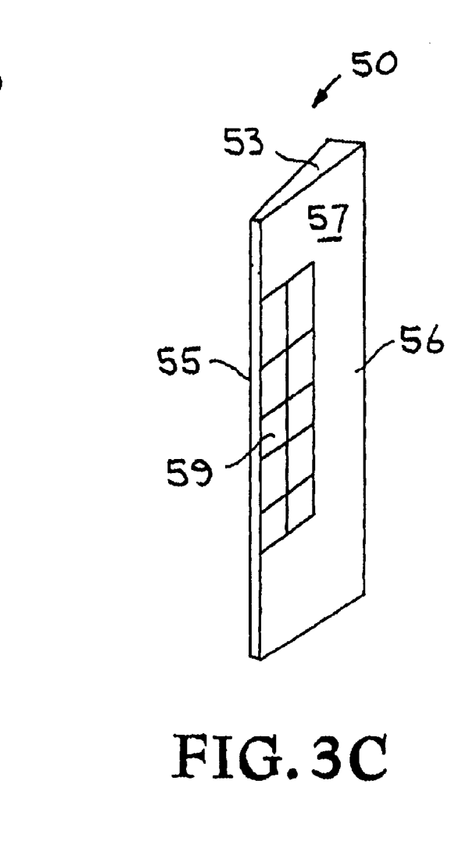

The counterbalancing effect is illustrated in FIG. 3. A part 57 is shown at three different times in the process in FIG. 3. The part 57 shown in the middle view 52 is peened on the first side 54. As show in the views 51 and 52, peening an area 58 on one side of a thin section material will result in distortion curvature because of the residual compressive stress. As shown in view 53, peening on the first side 55 of a thin section material resulted in distortion curvature because of the residual compressive stress, but after peening in an equivalent stress 59 to the back side 56, the part will return to near straight condition.

This embodiment employs only laser peening from one side at a time and places a materiel on the back side that couples the shock wave out of the metal preventing its reflection and deleterious effect. It also uses a rectangular beam that allows precise and uniform overlap of pulses and hence highly uniform compressive stress from front to back side within the part. In treating an entire piece, using this uniform beam, one approach is to peen the desired area with a single layer placing the rectangular spots precisely adjacent to each other. After this first step the piece will distort in a convex shape with respect to the direction of laser peening. Next, the piece is flipped around and the reverse side peened with a matched layer generating an identical counterbalancing compressive residual stress field. As this laser peening is completed, the distortion is essentially removed. To impart multiple laser peening layers, the process can be repeated, by starting laser peening on the second side and positioning the individual laser peening spots so that the center of an individual spot coincides with the four-corner area of the previous laser peening pattern. After the second side is peened, the part is reversed and the second area is peened in a like manner.

In order to laser peen both sides of the thin section component with minimal distortion, several different approaches can be taken with respect to placing the individual pulses that comprise to overall treatment pattern. As discussed in the above referenced patents, previous workers have had difficulty with distortion believed to be primarily associated with the circular nature of their laser spot and its non-uniform intensity profile. This causes the generation of non-identical compressive residual stress fields on either side of the part, thus imparting distortion to the part's geometry.

Co-pending U.S. patent application Ser. No. 09/133590, filed Aug. 13, 1998, now U.S. Pat. No. 6,198,069 issued Mar. 6, 2001, entitled "Laser Beam Temporal and Spatial Tailoring for Laser Shock Processing," (the disclosure of which is incorporated herein by reference) describes an effective means for delivering highly uniform rectangular spots that provide excellent local uniformity. The U.S. patent application Ser. No. 09/133590 now U.S. Pat. No. 6,198,069, invention is a method for formatting the laser spatial shape and for effectively and efficiently delivering the energy to a work surface in the laser shock process. An appropriately formatted pulse helps to eliminate breakdown and generate uniform shocks. The invention uses a high power laser technology capable of meeting the laser requirements for a high throughput process, that is, a laser which can treat many square centimeters of surface area per second.

Another means for delivering highly uniform rectangular spots is described in U.S. Pat. No. 5,689,363, entitled Long-Pulse-Width Narrow Bandwidth Solid State Laser. U.S. Pat. No. 5,689,363 is incorporated herein by reference. According to an embodiment disclosed therein, a laser head with rectangular slab amplifier comprises a laser system that emits a rectangular shaped beam with near diffraction-limited divergence and near transform-limited bandwidth. The system consists of one or more flashlamp-pumped Nd:glass zig-zag amplifiers, a very low threshold SBS phase conjugator system, and a self seeded single frequency Nd:YLF master oscillator. Completely passive polarization switching provides eight amplifier gain passes. Multiple frequency output can be generated by using SBS cells having different pressures of a gaseous SBS medium or different SBS materials. This laser system produces a long pulse, low divergence, narrow-bandwidth, multi-frequency output. Because of its high average power and high beam quality, this system has application in any process which would requires a long pulse format, including the material processing application of the present invention.

Figure 4:
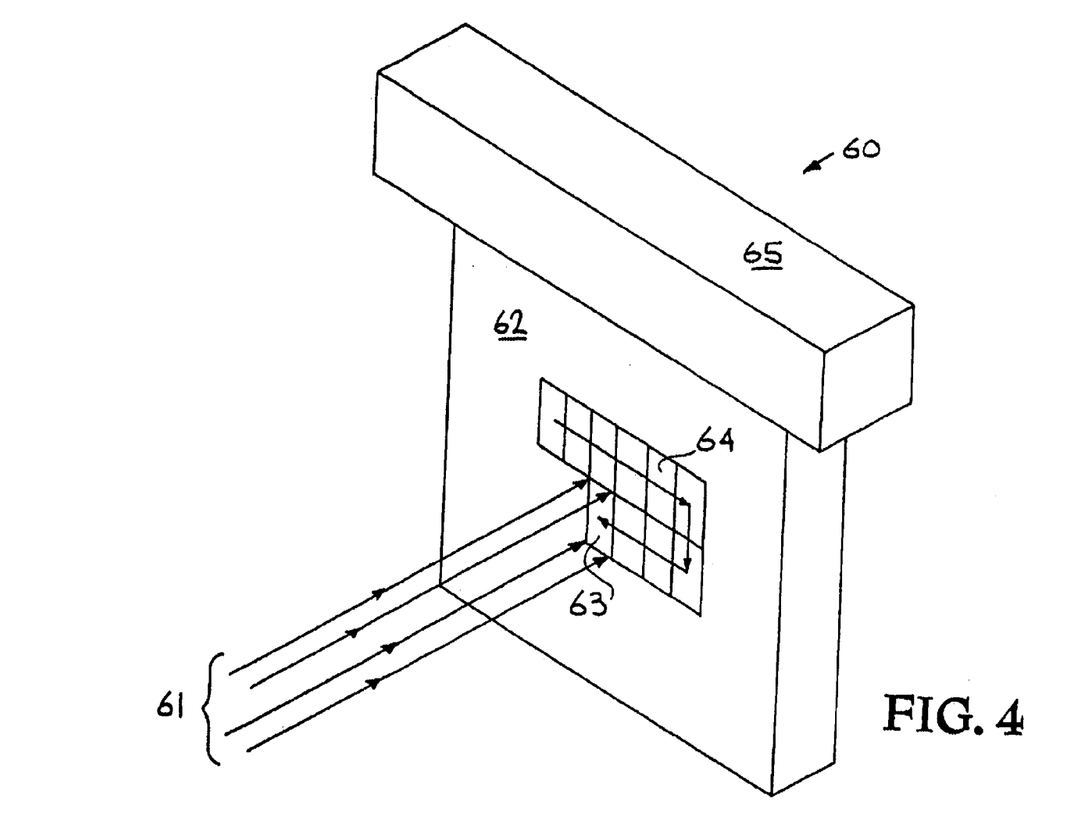
FIG. 4 shows rectangular pulses systematically applied next to each other with just overlapping edges.

Referring now to FIG. 4, a component 62 being peened is shown and designated generally by the reference numeral 60. The component is handled by a part gripper and motion controller 65. A laser beam 61 is directed onto the component 62 being peened. The laser beam 61 produces a spot 63 on the component being peened. The peened area 64 is produced. As shown in FIG. 4, the rectangular pulses are systematically applied next to each other with just overlapping edges. This greatly minimizes distortion of the peened part because a highly uniform and highly repeatable stress is applied to each side of the part. This laser peening or laser shock processing process is especially valuable for jet turbine engines. FAA Service Difficulty Reports show that there are an average of 15 uncontained rotor failures per year in the US involving turbine powered aircraft. Turbine engine uncontainment events were identified as the top priority by the Aerospace Industries Association Continued Airworthiness Assessment Methodologies Report.

Laser peening or laser shock processing of the leading edge of turbine blades has been clearly shown to halt the growth of cracks and enormously reduce blade failure. The leading edges of these titanium alloy blades are 1 to a few millimeters in thickness and must be carefully treated in the laser peening or laser shock processing process to avoid damage and distortion. In the process developed and patented by personnel of LSP, Inc., of Dublin, Ohio, (European Patent Application 82810554.4 filed Dec. 12, 1982 entitled "Split Beam Method of Altering Material Properties" filed by Clauer et al) and a similar process patented by General Electric Aircraft Engines of Cincinnati, Ohio (U.S. Pat. No. 5,531,570 "Distortion Control for Laser Shock Peened Gas Turbine Engine Compressor Blade Edges" by S. R. Mannava et al of General Electric Company) the simultaneous peening or laser shock processing of both sides of the blade is described as the means to reduce distortion. As described in the GE patent, "the blade may have laser shock peened surfaces on both suction and pressure sides of the blade wherein both sides were simultaneously laser shock peened. The process is performed with circular shaped laser beams which is a consequence of the previous laser design and makes uniform overlap of the peened areas difficult. The inventors/authors describe" circular laser shocked areas such that the suction side pattern is different from the compression side pattern and each of the patterns includes overlapping rows of circular laser shocked areas." The simultaneous peening or laser shock processing of both sides of the blade and the use of varying overlap of the circular patterns are described in the GE patent.

In the process, laser light of typically 100 to 200 J/cm2 passes through a confining layer (typically 1 mm thickness of water) and is incident on an ablation layer (typically a plastic of a few hundred micron thickness) to create a high pressure shock wave. Although the laser pulse lasts for only 20 ns, the shock wave propagates through the blade at acoustic sound speed which is approximately 4000 meters per second for titanium 6-4 alloy. In order to travel the blade thickness of 1 mm to 2 mm requires 250 ns to 500 ns. For a laser beam incident from each side simultaneously, the laser pulse and plasma pressure are well dissipated by the time the shock wave reaches the opposite side, hundreds of nanoseconds later. The plasma pressure of about 70 kbar that formed on each side during the incident pulse has lifted the water covering layer off the surface by approximately 40 microns. Now the backside has just the ablation layer which is a poor acoustic match to the metal and beyond it a void left by the displaced water layer. With this interface situation, the acoustic shock wave will mostly reflect as a tensile wave back into the metal. The intensity of the reflected stress wave will be given by the formula (see "Behavior of Metals Under Implusive Loads" by John S. Rinehard and John Pearson, page 42, Dover Publications, Inc., New York 1954);

$$R = (\rho_1 c_1 - \rho_1 c_1)/(\rho_1 c_1 - \rho_1 c_1)$$

Where $\rho_1$ is the metal density, $\rho_2$ is the density of the material just across the boundary (one atmosphere of air or the impedance of the remaining ablation layer since the pressure pulse has dissipated), $c_1$ and $c_2$ are the velocities of sound in the respective media. For Titanium with a density of 4500 kg/m3 and a sound velocity of 4000 m/s and air with a density of 1.29 kg/m3 and a sound velocity of 340 m/s the reflected intensity is R=−1 where the minus sign indicates a tensile reflected wave.

For dual sided peening, a strong tensile wave reflects from both sides of the metal/air interface and can overlap in the center forming a tensile wave of twice the incident stress. This strong tensile stress can cause cavitation and spalling within the metal. For air or the low density ablation layer the reflectivity is essentially unity.

A uniformly controlled, rectangular shaped laser pulse is incident from one (front) side only and creates a shock wave. On the back side a liquid such as water or fluorinert is flowed over the surface directly behind the area to be peened with a thickness of about 1 mm. Alternately a sound absorbing material can be pressed against the surface. Using the density of water as 1000 kg/m3 and the sound velocity as 1461 m/s as the shock wave propagates to the back side the reflected wave is now of intensity R=−0.84 for water.

This wave propagates back as a tensile wave but now has no counter propagating wave with which to interfere. Thus the magnitude of the tensile force is reduced by a factor of 2.4 a factor that can be critical in preventing cavitation or spalling in the material.

Figure 5:
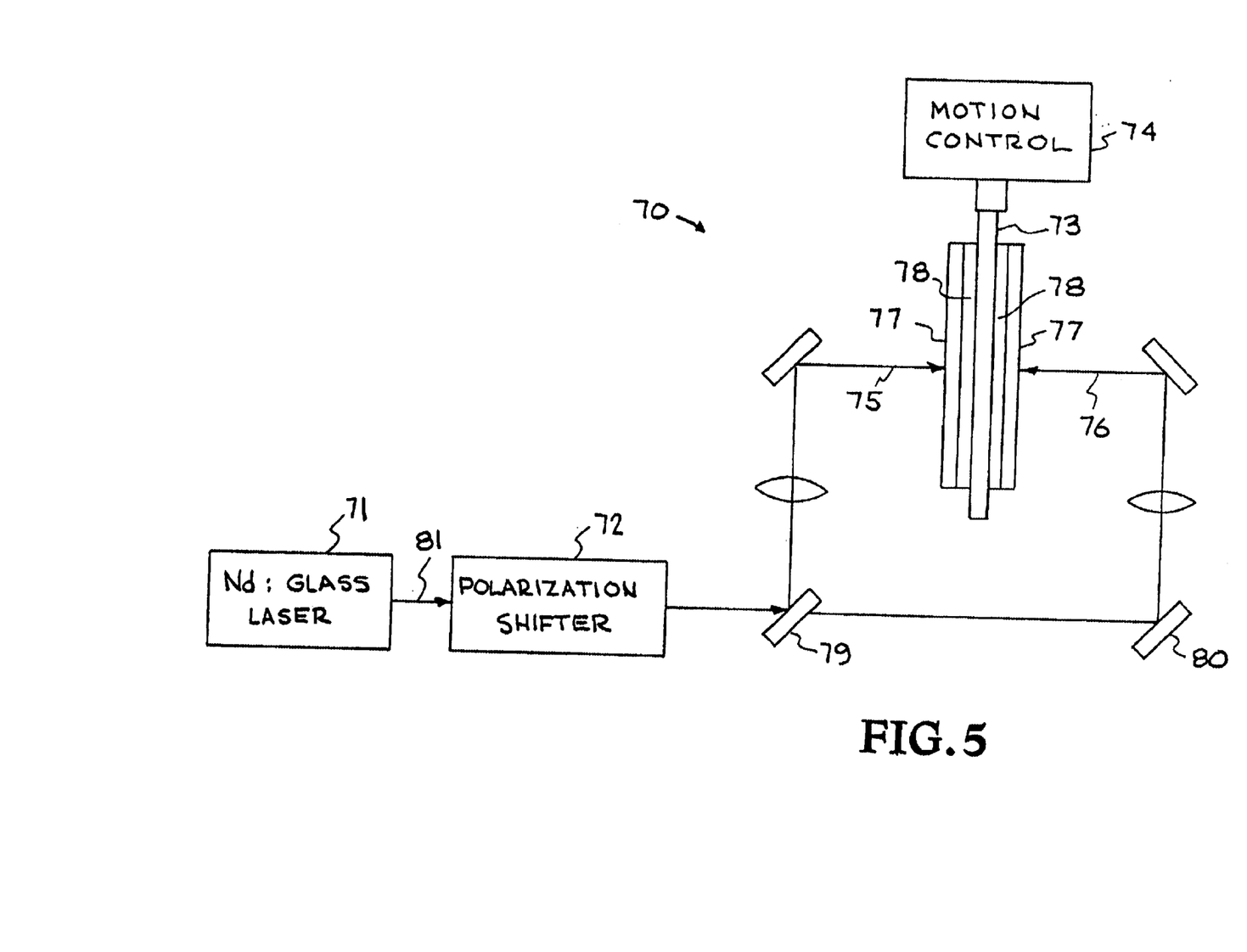
FIG. 5 shows a system for laser peening a part.

Referring now to FIG. 5, an alternate approach to dual sided laser peening of thin sections is to peen individual spots first on the front side and then on the backside. The structural elements of the system are shown. A Nd:glass Laser 71 produces laser beam 81. The polarization rotator 72 provides the position of ¼ polarization shifter and causes the beam to take propagate along one of two paths, either up/to right or horizontal/up/to left path. A polarization beam splitter 79 controls the polarization of the laser 71 to be either transverse electric or transverse magnetic causing the beam 81 to either pass through the splitter 79 or reflect off of it. The part 73 is handled by the motion controller 74 which moves the part 73 after 2nd,4th, 6th, . . . pulse. The surface of the part 73 is coated with an ablative layer 78 and a pressure confinement (tamping) layer 77. The polarization rotator 72 provides for two alternate beam paths 75 and 76. One beam path 75 images the beam onto the front side 75. This side fires for pulses 1,3,7 etc. One beam path imaging the beam onto the back side 76. This side fires for pulses 2,4,6, etc. This allows local laser peening of the front side and back side on sequential laser pulses.

To accomplish the dual sided laser peening, the single beam 81 output of the laser 71 passes through a polarization rotator 72 and then onto a polarization beam splitter 79. By controlling the polarization of the laser 71 to be either transverse electric or transverse magnetic, the beam 81 can be made to either pass through the splitter 79 or reflect off of it. This provides for two possible beam paths 75 and 76 one imaging the beam onto the front side 75 and one onto the back side 76. This allows local laser peening of the front side and back side on sequential laser pulses. The desired surface area is then treated by stepping pulses over the desired peening area while alternating between front and back sides of the piece.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of altering the properties of a metal piece, said metal piece having first side and a second side, comprising the steps of:

laser peening all or a portion of said metal piece from said first side by directing at least one laser beam onto said metal piece from said first side creating a multiplicity of pressure pulses in said metal piece, operatively connecting a fluid acoustic coupling material to said second side of said metal piece coupling said multiplicity of pressure pulses out of said metal piece from said second side, and maintaining said fluid acoustic coupling material operatively connected to said second side of said metal piece throughout said step of operatively connecting a fluid acoustic coupling material to said second side of said metal piece coupling said multiplicity of pressure pulses out of said metal piece from said second side, wherein said fluid acoustic coupling material functions to couple said multiplicity of pressure pulses out of said metal piece into said fluid acoustic coupling material throughout said step of operatively connecting a fluid acoustic coupling material to said second side of said metal piece coupling said multiplicity of pressure pulses out of said metal piece from said second side.

2. The method of claim 1, wherein said fluid acoustic coupling material is a florochemical electronic liquid.

3. The method of claim 1, wherein said step of laser peening said metal piece from said first side processes rectangular spots on said first side.

4. The method of claim 1, wherein said step of laser peening said piece from said first side utilizes a laser that provides a substantially rectangular spot.

5. The method of claim 1, including the steps of operatively connecting a fluid acoustic coupling material to said first side of said metal piece and laser peening all or a portion of said metal piece from said second side.

6. The method of claim 5, wherein said step of laser peening said piece from said second side utilizes a laser that provides a substantially rectangular spot.

7. The method of claim 5, wherein said step of laser peening said metal piece from said second side processes rectangular spots on said second side.

8. The method of claim 1, wherein said fluid acoustic coupling material is water.

9. The method of claim 1, wherein said fluid acoustic coupling material is a nonflammable fluorocarbon compound or water.

10. The method of claim 1, wherein said fluid acoustic coupling material is a nonflammable fluorocarbon compound.

11. The method of claim 1, wherein said step of laser peening all or a portion of said metal piece from said first side includes operatively connecting an ablation layer of material to said first side of said metal piece and transmitting laser light into said ablation layer of material.

12. The method of claim 11, wherein said laser light is transmitted into but not out of said ablation layer of material.

13. The method of claim 12, including operatively connecting a tamping layer to said ablation layer of material.

14. The method of claim 1, including the steps of operatively connecting fluid acoustic coupling material to said first side of said metal piece and laser peening said metal piece from said second side, wherein said laser peening is produced by laser pulses alternately directed onto said first side and said second side, wherein sequential laser pulses are stepped over said first side and over said second side while alternating between said first side and said second side.

15. The method of claim 14, wherein said sequential laser pulses are stepped over said first side and over said second side while alternating between said first side and said second side on equivalent spots on said first side and said second side.

16. The method of claim 15, wherein said equivalent spots on said first side and said second side are adjacent to each other.

* * * * *